United States Patent [19]

Rocha et al.

[11] Patent Number: 4,546,658

[45] Date of Patent: Oct. 15, 1985

[54] PIEZOELECTRIC FORCE/PRESSURE SENSOR

[75] Inventors: Henry A. F. Rocha; John D. Harnden, Jr., both of Schenectady, N.Y.

[73] Assignee: General Electric Company, Schenectady, N.Y.

[21] Appl. No.: 583,466

[22] Filed: Feb. 24, 1984

[51] Int. Cl.[4] .............................................. G01L 1/16
[52] U.S. Cl. .............................. 73/862.59; 73/862.68; 73/DIG. 4; 310/338
[58] Field of Search ................ 73/862.59, 862.68, 581, 73/582, 703, 778, DIG. 1, DIG. 4; 310/328, 329, 338

[56] References Cited

U.S. PATENT DOCUMENTS 1,930,905 10/1933 Nicolson ......................... 310/328 X
2,137,852 11/1938 Nicolson ......................... 310/328 X Primary Examiner—Charles A. Ruehl Attorney, Agent, or Firm—Geoffrey H. Krauss; James C. Davis, Jr.; Marvin Snyder

[57] ABSTRACT

A piezoelectric force/pressure sensor capable of detecting the magnitude of static and dynamic force or pressure applied thereto, utilizes first and second transducers each having a piezoelectric member with opposed first and second surfaces; an electrode fabricated upon each of the first and second surfaces of each of the first and second piezoelectric members; and a member fabricated of a material of known resiliency having first and second opposed surfaces each attached to one of the electrode-bearing first and second surfaces of a different one of the piezoelectric transducers. A first of the piezoelectric transducers is excited to vibrate in the thickness mode. The vibrations are coupled through the interposed elastic middle layer and are transformed to provide an electrical output from the sensor which is responsive to the force/pressure applied along the axis of the transducer-resilient member-transducer sandwich.

20 Claims, 3 Drawing Figures

PIEZOELECTRIC FORCE/PRESSURE SENSOR

BACKGROUND OF THE INVENTION

The present application relates to force/pressure sensors and, more particularly, to a novel piezoelectric force/pressure sensor capable of measuring static and dynamic force or pressure.

Many force/pressure sensors are well known to the art for use in a multiplicity of diverse applications. The known sensors range from simple spring-actuated devices to elaborate wire and semiconductor strain gages. Each of the sensor types has its own limitations. Spring-actuated sensing devices, for example, are difficult to interface with electronic systems and typically suffer from bearing-wear problems. Strain gages, of wire, semiconductor or other type, generally require careful mounting and elaborate temperature compensation; the output drift of such strain gage sensors often requires manual output zeroing and use in a bridge configuration. Manufacture with the customary bridge configuration is itself relatively expensive. Electronic control technology for such diverse products as home appliances and automobile engines requires a force/pressure sensor which is not only extremely reliable, but also relatively inexpensive to produce. It has been suggested to use piezoelectric transducers for detection of transient or alternating force/pressures, as is utilized for transient sensing of weak sonar echoes and geophysical prospecting over-pressure indications. However, because piezoelectric transducers are of a capacitive nature, such a transducer cannot be directly utilized for sensing static forces or pressures. Accordingly, it is desirable to provide a reliable and relatively inexpensive sensor of the piezoelectric type, which is capable of directly measuring static, as well as dynamic, force/pressure applied to the sensor.

BRIEF SUMMARY OF THE INVENTION

In accordance with the invention, a piezoelectric force/pressure sensor capable of detecting the magnitude of static and dynamic force or pressure applied thereto, comprises: first and second transducers each having first and second surface electrodes. Means for electrically exciting one of the piezoelectric transducers to resonance in the thickness mode is attached between the first and second surface electrodes of that transducer. Means for detecting the electrical output between the first and second electrodes of the remaining transducer, responsive to mechanical vibration acoustically coupled through the interposed elastic middle layer, provide an electrical output from the sensor which is responsive to the force/pressure applied along the axis of the transducer-resilient member-transducer sandwich.

In a presently preferred embodiment, in which each of the transducers include a piezoelectric member of similar thickness and diameter to realize a substantially similar resonant frequency, one of the sensor exterior surfaces is positioned against a substantially non-yielding surface while the other piezoelectric member exterior surface receives a force, or pressure (as a force-per-unit-area), substantially normal thereto. The resulting piezoelectric transducer sensor, hereinafter referred to as a "Piezogage", provides an output signal, at the oscillator frequency, having a non-zero magnitude for a zero magnitude applied force/pressure, and having a monotonically-increasing magnitude for increasing magnitudes of applied force/pressure.

Accordingly, it is an object of the present invention to provide a novel piezoelectric force/pressure sensor capable of providing an electric output as a function of static and dynamic force/pressure applied thereto.

This and other objects of the present invention will become apparent upon reading of the following detailed description of the invention, when considered in conjunction with the drawings.

DETAILED DESCRIPTION OF THE INVENTION

Figure 1:
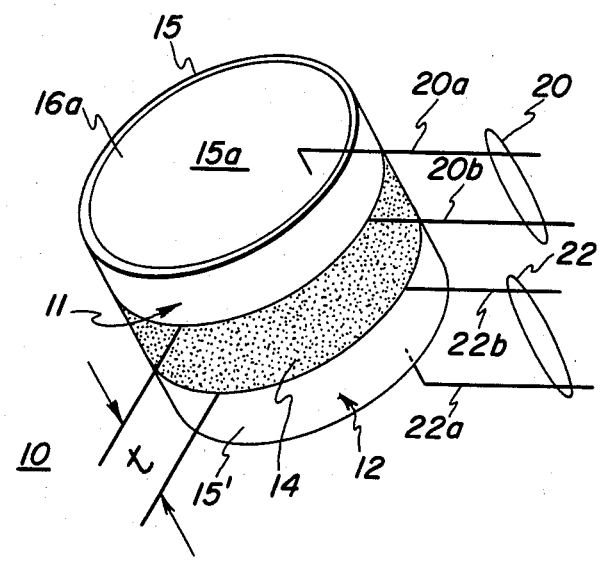
FIG. 1 is an oblique view of a Piezogage, illustrating the novel structure of the piezoelectric force/pressure sensor of the present invention.
Figure 2:
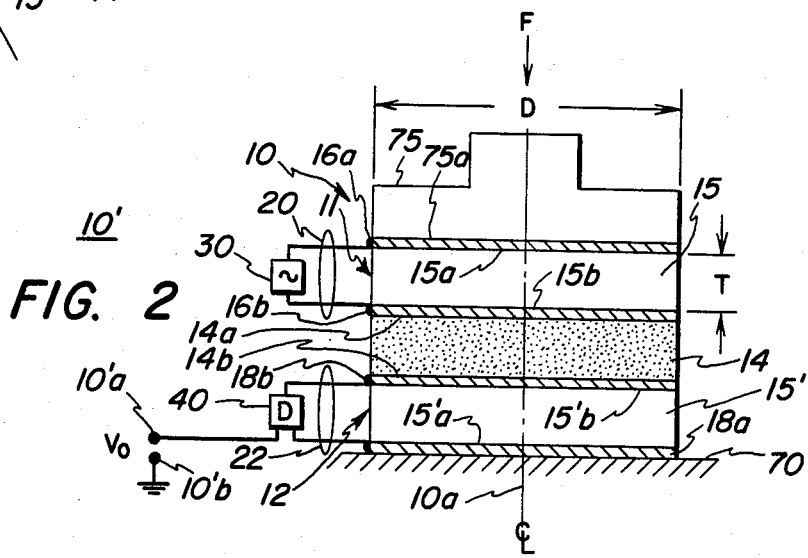
FIG. 2 is a sectional view of the Piezogage sensing element and of the associated elements utilized therewith for forming a completed force/pressure sensor.

Referring initially to FIGS. 1 and 2, a Piezogage piezoelectric force/pressure sensor 10 utilizes first and second piezoelectric transducers 11 and 12, separated from one another but intimately attached to an intermediate, or middle, layer 14 of a material with a known, and substantially uniform, resiliency. Each of piezoelectric transducers 11 and 12 is comprised of a piezoelectric member 15 or 15', preferably of cylindrical shape. Each member 15 or 15' has a diameter D (FIG. 2) of between about one-eighth inch and about one inch, and a thickness T of between about one-sixteenth inch and about one-quarter inch. Each member 15 or 15' has first and second opposed major (substantially circular) surfaces 15a and 15b or 15'a and 15'b, respectively. An electrode 16a, 16b, 18a or 18b is fabricated upon each of the associated piezoelectric element major surfaces 15a, 15b, 15'a or 15'b, respectively. Lead means 20, such as a pair of electrical leads 20a and 20b respectively connected to electrodes 16a and 16b, or lead means 22, such as a pair of electrical leads 22a and 22b respectively connected to electrodes 18a and 18b, are provided for coupling an excitation signal to one of the transducers, e.g. transducer 11, and for providing a received signal from the other transducer, e.g. transducer 12. Advantageously, lead means 20 and 22 will exit in, or near, the plane of the electrodes 16 or 18 fabricated upon the opposed major surfaces of transducer member 15 or 15'.

A layer 14 of a material with a known, substantially uniform, resiliency, is fabricated to a thickness t (FIG. 1) of between about one-sixteenth inch to about one-half inch, dependent upon the thickness T of the piezoelectric members 15 and 15', and the desired force/pressure response to be achieved by the sensor. Resilient layer 14 is typically of cylindrical shape, typically having the same diameter D as the piezoelectric elements 15 and 15'. Resilient layer 14 thus has a pair of opposed major, substantially circular, surfaces 14a and 14b, which are respectively placed in abutment with, and intimately attached, as by a cementing means and the like, to the exterior surface of one of the electrodes, e.g. the exterior surface of electrode 16b, of the first piezoelectric member, e.g. member 15, and to the exterior surface of one of the electrodes, e.g. electrode 18b, of the other piezoelectric transducer, e.g. piezoelectric transducer 12. Thus, the piezoelectric sensor comprises a three-layer sandwich of the first piezoelectric transducer 11, the substantially-uniformly-resilient layer 14 and the second piezoelectric transducer 12, with the resilient layer intimately attached to one of the two electrodes forming part of each transducer 11 and 12. In the illustrated presently preferred embodiment, both of the transducer elements and the resilient layer are of substantially cylindrical shape, having a common center line 10a.

Referring now particularly to FIG. 2, the sensor system 10' utilizes sensor 10 in conjunction with an excitation source, such as an oscillator means 30, coupled to the lead means 20 of the "active" transducer 11 and a detector means 40 coupled through lead means 22 to the "passive transducer" 12 of the sensor. The oscillator means 30 provides a waveform, e.g. a sinusoidal A.C. signal waveform, at a frequency F on the order of the resonance frequency of active transducer element 11. Advantageously, while transducer elements 11 and 12 can be mass produced, maximum Piezogage sensitivity will be achieved if both transducers 11 and 12 have the same resonant frequency and if oscillator means 30 is set for that resonant frequency. It should be understood that operation of the Piezogage sensor system 10' is equally possible with the frequency of oscillator means 30 being above or below the resonant frequency of transducers 11 and 12 (if both are of substantially the same resonant frequency) or above or below the resonant frequency of either of the transducer elements 11 or 12, if the transducer elements are not of substantially the same resonant frequency.

In operation, active piezoelectric transducer 11 produces, when electrically excited by the periodic waveform of oscillator means 30, a periodic mechanical vibration in the direction of center line 10a, as transducers 11 and 12 operate in the thickness vibrational mode. The axial mechanical vibrations, i.e. in the direction of center line 10a, are transmitted through middle elastic layer 14 and are received by the passive transducer 12. The axial mechanical vibrations received by the passive transducer are transformed into electrical energy, i.e. an electrical voltage V22 between lead means 22, which voltage is measured by detector means 40 to provide a system output voltage $V_0$ at system output terminal 10'a, with respect to a system common potential terminal 10'b. Detector means 40 may be any suitable means for detecting electrical energy at the frequency F of oscillator means 30, such as an A.C. voltmeter, a full-wave detector, and the like detection means.

Figure 3:
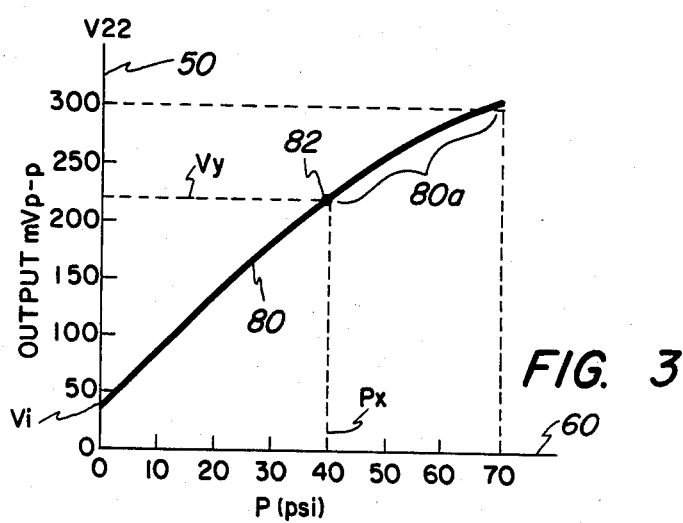
FIG. 3 is a graph illustrating the electrical output versus pressure input for one presently preferred embodiment of the Piezogage sensor illustrated in FIGS. 1 and 2.

Referring now to all of the Figures, and particular to FIGS. 2 and 3, in which latter Figure the output V22 measured between the electrodes of the passive transducer 12 of a sensor 10, is plotted along ordinate 50 in terms of peak-to-peak millivolts, for pressures, in pounds per square inch (psi), plotted along abscissa 60. The outwardly-facing electrode, e.g. electrode 18a, of the passive transducer, e.g. transducer 12, is typically placed in abutment with a substantially immovable surface 70. The force, or pressure, to be measured is advantageously uniformly distributed over the surface of the outer electrode, e.g. electrode 16a, of the active transducer, e.g. transducer 11. This uniform application of force/pressure over the transducer electrode 16a outer surface may be facilitated by use of a member 75, having a substantially circular surface 75a of a diameter substantially equal to the diameter D of the active transducer, although it should be understood that the diameter of surface 75a may be somewhat less than, and considerably greater than, transducer diameter D. Member 75 has a portion 75b receiving the force F or the pressure which, if uniformly distributed over the face of the transducer by member 75, is interchangeable with force F by a proportionality constant S, such that pressure P equals the product of the proportionality constant S and the resultant force F on the transducer, i.e. $P = S \times F$.

For application of a zero-magnitude force or pressure, the axial mechanical vibration of active transducer 11 is coupled through intermediate resilient layer 14 to passive transducer 12 and provides a non-zero output voltage V22 magnitude $V_i$, e.g. about 40 mV. p-p, as shown for zero pressure in FIG. 3, for a transducer having one inch diameter piezolelectric members with transducer thickness T on the order of one-eighth inch, and selected for resonance with an oscillator means 30 providing a four-volt peak-to-peak sine wave at about 800 KHz. transducer resonant frequency. As the pressure P (or force) is increased, resulting in increased axial force F magnitudes, the compliance of the middle resilient layer 14 changes responsive to the force effectively applied between the outer electrode faces of transducer 10 and changes the coupling between the active transducer 11 and passive transducer 12 accordingly. As increased force/pressure is applied, the coupling increases and the resulting increase in the passive transducer output voltage V22 is illustrated as curve 80 in FIG. 3.

The slope of curve 80 will be affected by the thickness t and type of material utilized for the coupling layer 14. As force/pressure is increased, the coupling layer 14 material, e.g. an elastomer and the like, will undergo a change in compliance and the rate-of-change of output voltage to input force/pressure will decrease (as shown in the upper portion 80a of the curve) although a monotonic response continues to be provided. If Piezogage system 10' is utilized to provide an output signal indicative of the measured parameter, e.g. pressure, exceeding a predetermined value, e.g. 40 psi, then a comparator can be utilized to detect the value of output voltage $V_0$ corresponding to the lead means 22 voltage V22, e.g. about 225 mV. pp, corresponding thereto, as indicated by point 82 on the curve. If an absolute force or pressure indication is required, the output voltage $V_0$ can be referenced against a look-up table generated for each particular sensor 10 or sensor system 10', in manner well known to the electronic control arts.

While a presently preferred embodiment of our novel piezoelectric force/pressure sensor and sensor system has been described in detail herein, many modifications and variations will now become apparent to those skilled in the art. In particular, the use of a multiplicity of sensors, each being an element of a layered set of sensors with one or more such sensors being externally excited and one or more such sensors being modulated directly or indirectly by the physical quantity to be measured, can be utilized. Any piezoelectric material (such as PZT and the like) can be utilized for the transducers 11 and 12 and any resilient material (such as any of the room-temperature-curing silicones and the like) can be utilized for intermediate layer 14. Each sensor can have transducers resonant in a wide frequency range, as between $10^3$ Hz. and about $10^6$ Hz. Accordingly, we intend to be limited only by the scope of the appending claims and not by the specific details or instrumentalities provided by way of description of the presently preferred embodiment described herein.

What we claim is:

1. A sensor for measuring the magnitude of a force or pressure incident thereon, comprising:

a resilient layer having first and second opposed surfaces;

first transducer means in abutment with said layer first surface for imparting mechanical vibration with a known frequency and amplitude to said layer; and second transducer means in abutment with the remaining surface of said layer for receiving the vibratory motion transmitted through said layer and for converting the received amplitude of the vibratory motion to an output signal having the same frequency as the imparted vibration frequency and an amplitude responsive to the known amplitude of the mechanical vibration imparted to said first transducer and monotonically to the compression of said layer and responsive to said force or pressure to be measured.

2. The sensor of claim 1, wherein said resilient layer is fabricated of a material having a substantially uniform resiliency.

3. The sensor of claim 2, wherein said resilient layer material is an elastomer.

4. The sensor of claim 3, wherein said resilient layer has a thickness between about one-sixteenth inch and about one-half inch.

5. The sensor of claim 1, wherein at least one of said first and second transducer means comprises: a member of a piezoelectric material, said member having at least a first surface abutting one of said resilient layer surfaces.

6. The sensor of claim 5, wherein said member has a second surface opposed to said first surface, and said at least one transducer means further comprises: first and second electrodes, each fabricated upon an associated one of said member first and second surfaces.

7. The sensor of claim 6, wherein the electrode fabricated upon said member abutting said resilient layer is at least partially sandwiched in abutment between said member and said layer.

8. The sensor of claim 7, wherein each of said transducer means is of substantially similar construction.

9. The sensor of claim 8, wherein each of said transducer means has a substantially similar resonant frequency.

10. The sensor of claim 9, wherein said transducer means resonates at a frequency on the order of $10^3$-$10^6$ Hz.

11. The sensor of claim 8, wherein each piezoelectric member is of substantially cylindrical shape and the axes of both said members substantially lie along a common axis.

12. The sensor of claim 11, wherein said resilient layer is of substantially cylindrical shape and has an axis substantially lying along said common axis.

13. The sensor of claim 11, wherein each member has a diameter of between about one-eighth inch and about one inch.

14. The sensor of claim 11, wherein each member has a thickness of between about one-sixteenth inch and about one-quarter inch.

15. The sensor of claim 1, wherein each transducer means further comprises lead means for transmitting electrical energy into and from each individual transducer means.

16. The sensor of claim 1, in combination with means for providing electrical excitation of known frequency and amplitude to a selected one of said transducer means; and detector means coupled to the other of said transducer means for providing an electrical signal at the excitation frequency and with an amplitude responsive to the excitation amplitude and the magnitude of a force externally acting on said sensor.

17. The sensor of claim 16, wherein said force is an external pressure distributed over at least a portion of one of said transducer means.

18. The sensor of claim 16, wherein said excitation means is an oscillator providing an output having a waveform at a frequency related to the resonant frequency of at least one of said transducer means.

19. The sensor of claim 18, wherein said oscillator output waveform is substantially sinusoidal.

20. The sensor of claim 16, wherein said signal-providing means is a detector means for providing an electrical output signal of magnitude responsive to the magnitude of that portion of the excitation signal provided at said other transducer means.

* * * * *